United States Patent
Jones et al.

(10) Patent No.: US 10,717,340 B2
(45) Date of Patent: Jul. 21, 2020

(54) TEMPERATURE BASED BLOWER STRATEGY FOR ACOUSTIC COMFORT

(71) Applicant: Ford Global Technologies, LLC, Dearborn, MI (US)

(72) Inventors: Curtis Mark Jones, Wixom, MI (US); Manfred Koberstein, Troy, MI (US); Alan Douglas Wallington, Livonia, MI (US); Zhengyu Liu, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 55 days.

(21) Appl. No.: 15/431,119

(22) Filed: Feb. 13, 2017

(65) Prior Publication Data

US 2018/0105022 A1 Apr. 19, 2018

Related U.S. Application Data

(60) Provisional application No. 62/409,989, filed on Oct. 19, 2016.

(51) Int. Cl.
| H05K 7/20 | (2006.01) |
| B60H 1/00 | (2006.01) |
| B60H 1/32 | (2006.01) |

(52) U.S. Cl.
CPC ..... *B60H 1/00828* (2013.01); *B60H 1/00735* (2013.01); *B60H 1/3205* (2013.01); *B60H 1/00* (2013.01); *B60H 1/00021* (2013.01); *B60H 1/00764* (2013.01); *B60H 1/00778* (2013.01); *B60H 2001/3266* (2013.01)

(58) Field of Classification Search
CPC .. B60H 1/00828; B60H 1/32905; B60H 1/00; B60H 1/00007; B60H 1/00021; B60H 1/00764; B60H 1/00778; B60H 2001/3266
USPC .................................................... 165/244
See application file for complete search history.

(56) References Cited

U.S. PATENT DOCUMENTS

| 4,919,195 A * | 4/1990 | Tanino ............... B60H 1/00864 165/201 |
| 5,547,125 A | 8/1996 | Hennessee et al. |
| 9,428,035 B2 | 8/2016 | Eisenhour |
| 2013/0312439 A1 | 11/2013 | Howell |
| 2014/0295746 A1 | 10/2014 | Chagnon et al. |
| 2015/0224848 A1 * | 8/2015 | Eisenhour ............ B60H 1/0075 62/186 |

\* cited by examiner

*Primary Examiner* — Joel M Attey
(74) *Attorney, Agent, or Firm* — David Coppielle; Brooks Kushman P.C.

(57) ABSTRACT

A vehicle climate system includes a blower and a controller. The controller is configured to, responsive to input of a particular user selected climate setting, operate the blower with an initial power having a predetermined value corresponding to the climate setting provided that cabin temperature is outside a predetermined range. The controller is also configured to operate the blower with an initial power having a value less than the predetermined value provided that the cabin temperature is within the predetermined range.

7 Claims, 2 Drawing Sheets

| Initial Interior Cabin Temperature (°C) | T1 | T2 | T3 | T4 |
|---|---|---|---|---|
| HVAC Fan Speed [manual blower setting] | V1 | V2 | V3 | V4 |

| Initial Interior Cabin Temperature (°C) | T1 | T2 | T3 | T4 |
|---|---|---|---|---|
| HVAC Fan Speed [manual blower setting] | V1 | V2 | V3 | V4 |

| Incar Temp (degC) | -5 | 0 | 25 | 33 |
|---|---|---|---|---|
| Blower Limit (V) | 13.5 | 11 | 11 | 13.5 |

TEMPERATURE BASED BLOWER STRATEGY FOR ACOUSTIC COMFORT

CROSS-REFERENCE TO RELATED APPLICATIONS

This application claims the benefit of U.S. provisional application Ser. No. 62/409,989 filed Oct. 19, 2016, the disclosure of which is hereby incorporated in its entirety by reference herein.

TECHNICAL FIELD

The present disclosure relates to controlling vehicle climate systems to improve acoustic comfort.

BACKGROUND

Vehicle climate systems control the cabin temperature for passenger comfort. To maximize system performance and provide customer comfort as quickly as possible at extreme ambient conditions, the HVAC blower may be run at maximum power capability. This maximum power, while providing optimal heating or cooling, may also generate high levels of noise, vibration, and harshness (NVH), regardless of environmental condition demands.

SUMMARY

According to an embodiment, a vehicle climate system includes a blower and a controller. The controller is configured to, responsive to input of a particular user selected climate setting, operate the blower with an initial power having a predetermined value corresponding to the climate setting provided that cabin temperature is outside a predetermined range. The controller is further configured to operate the blower with an initial power having a value less than the predetermined value provided that the cabin temperature is within the predetermined range.

In one or more embodiments, the value less than the predetermined value may be independent of the cabin temperature. The value less than the predetermined value may be dependent on the cabin temperature. The predetermined value may correspond to a maximum speed of the blower. The value less than the predetermined value may be defined as a percentage of the predetermined value. The predetermined value may be associated with an operating voltage or duty cycle.

According to an embodiment, a method includes, by a controller, responsive to input of a particular user selected climate setting, operating a blower with an initial power having a predetermined value that is independent of cabin temperature provided that the cabin temperature is outside a predetermined range. The method further includes operating the blower with an initial power having a value less than the predetermined value provided that the cabin temperature is within the predetermined range.

In one or more embodiments, the value less than the predetermined value may be independent of cabin temperature. The value less than the predetermined value may be defined as a percentage of the predetermined value. Operating the blower with an initial power having a predetermined value may include associating the initial power with an operating voltage or duty cycle. The predetermined value may correspond to a maximum speed of the blower.

According to an embodiment, a method includes, by a controller, responsive to input of a particular user selected climate setting, operating a blower with an initial power having a predetermined value that is independent of cabin temperature provided that the cabin temperature is outside a predetermined range. The method further includes operating the blower with an initial power having a value that is dependent upon the cabin temperature provided that the cabin temperature is within the predetermined range.

In one or more embodiments, the value that is dependent on the cabin temperature may correspond with an operating voltage for a given cabin temperature within the predetermined range. The value that is dependent on the cabin temperature may be defined as a percentage of the predetermined value. Operating the blower with an initial power having a predetermined value may include associating the initial power with an operating voltage or duty cycle. The predetermined value may correspond to a maximum speed of the blower.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figures 1, 2:
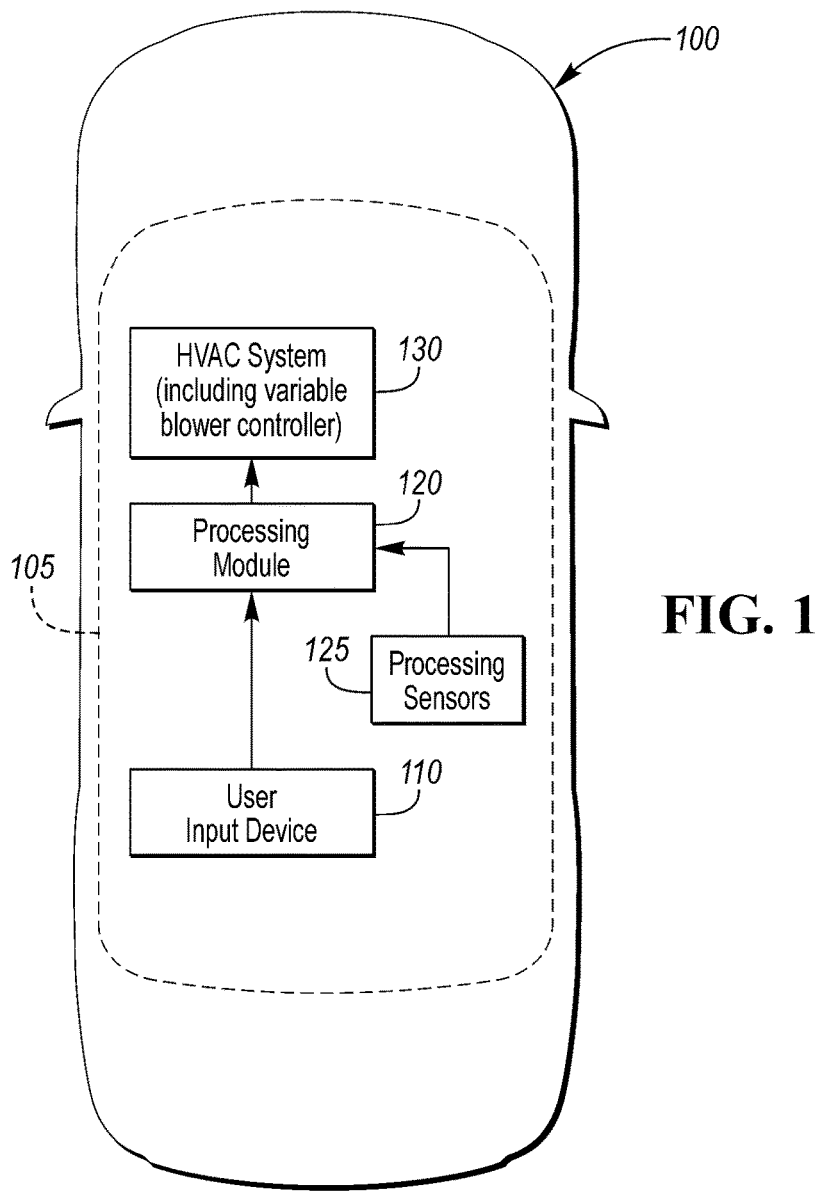
FIG. 1 illustrates an exemplary vehicle having a climate system.
FIG. 2 is an exemplary table used by a processing module.

FIG. 1 depicts an exemplary vehicle 100. The vehicle 100 may include any mode of transportation such as a car or truck. The vehicle 100 may include a passenger compartment, or vehicle cabin 105, where passengers sit during vehicle operation and is an enclosed part of the vehicle 100. Thus, the climate inside the vehicle 100, or cabin temperature, may be different from the climate outside the vehicle 100. The vehicle 100 also includes a climate system. While an example of a vehicle 100 and climate system is shown in the Figure, the components illustrated are not intended to be limiting. Additional or alternative components and/or implementations may be used.

The climate system of vehicle 100 includes at least the following: an HVAC system 130, a processing module 120, processing sensors 125, and a user input device 110. The HVAC system 130 may include any number of components configured to control aspects of the climate, such as cabin temperature of the vehicle cabin 105. The HVAC system 130 includes, but is not limited to including at least one blower and a controller. The controller may be a variable blower controller. The climate system may take multiple forms and include multiple and/or alternate components. For example, the climate system can be one system for the entire vehicle or separated for the front of the vehicle with one or more auxiliary climate systems for the rear of the vehicle. The HVAC system 130 may be configured to heat or cool the vehicle cabin based on various inputs to the controller. The controller outputs signals to the blower to operate the blower. The various inputs may be in the form of settings or modes which correspond with, but not limited to, predetermined temperatures or blower fan speeds.

The blower of HVAC system 130 may include any device, such as one or more electrically operated fans, configured to push air into the vehicle cabin 105. The blower may be controlled to rotate at a particular speed. The blower is controlled using a measure such as, but not limited to, voltage (or operating voltage), duty cycle, or a percentage of the voltage or duty cycle. That is, the speed of the blower 115 may be directly related to the operating voltage. As the blower operates, air from the HVAC system 130 is pushed into the vehicle cabin 105.

The user input device 110 may include any number of components located in the vehicle cabin 105 and configured to allow a user, such as a driver or other passenger, to interact with the climate system. The user input device 110 may be configured to receive various inputs from the user. Example user inputs may include a temperature setting, a blower speed setting, or a mode selection. The particular user selected climate setting may be, but is not limited to, the desired temperature of the vehicle cabin 105 or the discharge air temperature. The user selected climate setting may be a predetermined value for the temperature, speed, or mode. The blower speed setting may allow the user to increase or decrease the speed of the blower. User input device 110 includes a user interface for allowing a passenger to manually select the setting. The user input device 110 may include any type of interface including, but not limited to, a number of buttons, sliders, knobs, and the like. Alternatively, the user input device 110 may include a touch-sensitive surface or display screen configured to present virtual buttons to the user and receive user inputs via the virtual buttons.

The blowers may be operated in a "manual" mode such that a particular user selected climate setting is input to the user input device 110 which sends a signal to control the blower. In "manual" mode, for example, the passenger selects a setting which corresponds to an initial power for a speed of the blower. A user may select a speed in any mode, including, but not limited to, maximum A/C function or maximum defrost function. The user input device 110 provides a signal to the processing module 120, which outputs to the controller of the HVAC system 130 to control running of the blower. Based on a manual climate setting selection by the passenger at the user input device 110, the controller of HVAC system 130 operates the blower at a predetermined value, for example a maximum speed, for the system to quickly heat or cool the vehicle.

Processing module 120 of the climate system of vehicle 100 is configured to receive inputs and output control signals to the controller of the HVAC system 130 for controlling the blower. The processing module 120 includes any computing device configured to execute computer-readable instructions and a memory storage device. The memory storage device may include any volatile or non-volatile memory storage device configured to store on or more data types representing information used to control the climate system. The information stored in the memory device may include one or more default values, representing an operating voltage or duty cycle of the blower. The memory storage device may also store adjusted control values for initial power such as, but not limited to, operating voltages and duty cycles adjusted by a predetermined adjustment margin such as a percentage of the default values. FIG. 2 depicts an exemplary table 200 used by processing module 120 to evaluate the data indicative of temperature provided by processing sensors 125. The table can be stored in the memory storage device. The table 200 relates an initial interior cabin temperature 210 with a control value for an HVAC fan speed 220, as set by the manual blower setting.

Figures 3, 4:
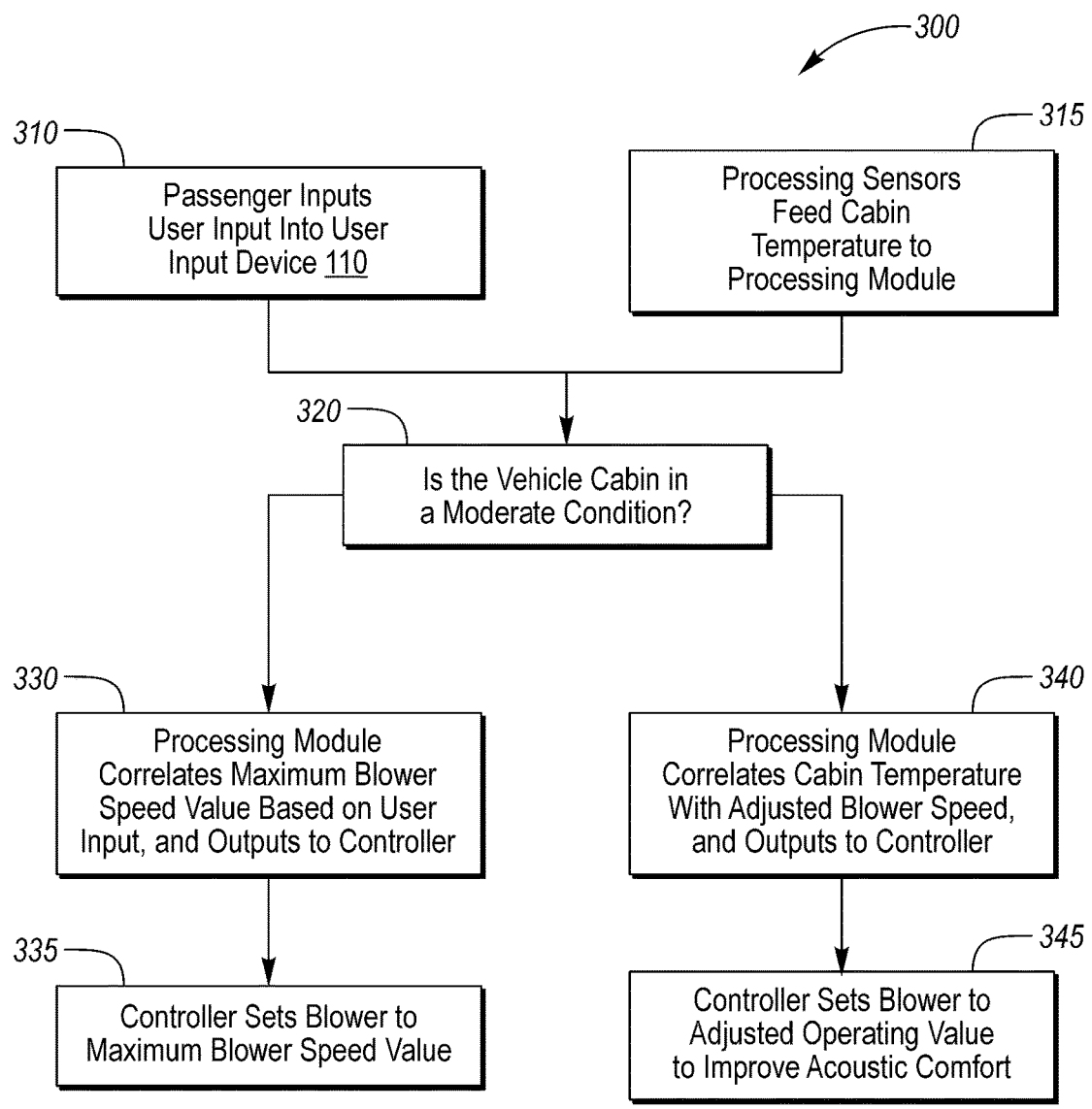
FIG. 3 is a control strategy for reducing NVH harshness when the vehicle cabin is in a moderate condition.
FIG. 4 is an exemplary table with values used by the processing module.

The processing sensors 125 also send signals to processing module 120. The processing sensors 125 may be, without limitation, temperature sensors which provide data indicative of the temperature inside the interior cabin 105 of the vehicle 100. The processing module 120 evaluates the data indicative of temperature to output a control signal to the controller. The evaluation of the temperature data may be based on low and high threshold temperatures defining a predetermined range where the temperature of the vehicle cabin 105 is moderate. The processing module 120 evaluates the conditions using the initial interior cabin temperature 210 to determine which value to output to the controller for the HVAC fan, or blower, speed 220. The processing sensors 125 collect the data indicative of temperature when the user manually selects the setting at user input device 110. When the cabin temperature 210 is considered moderate, i.e., initially within the predetermined range, the HVAC fan speed need not run at the maximum blower speed, and the processing module 120 signals the controller to run the blower at levels indicated in the table 200. FIG. 4 shows an example of the table used by processing module 120 with exemplary values.

Based on the data indicative of temperature acquired by the processing sensors 125, the processing module 120 can determine if the initial cabin temperature 210 is moderate, i.e., where a maximum speed of the blower is not necessary given the ambient conditions of the vehicle cabin 105. The cabin temperature 210 is moderate when it falls within the predetermined range, defined by temperature thresholds, within the cabin 105. For example, the low threshold may be −5 degrees Celsius and the high threshold may be 33 degrees Celsius, such that any temperature therebetween, e.g. 0 degrees Celsius and 25 degrees Celsius, falls in the predetermined range and is considered moderate.

The processing module 120 signals the controller to set the blower to a speed based on the stored table 200 according to whether the temperature within the cabin 105 is within the predetermined range or not. Outside the predetermined range, the processing module 120 signals the controller to operate the blower at a predetermined value based on the initial value for power associated with the manually selected climate setting, based on the default values in the table. The predetermined value may correspond to a maximum speed of the blower. The maximum speed may correlate to, without limitation, the default values for operating voltage or duty cycle. Within the predetermined range, the processing module signals the controller to operate the blower at an adjusted initial value for power, which is a value for initial power that is less than the predetermined value. The value less than the predetermined value may be independent of temperature, that is the value for initial power is the same within the predetermined range, or may be dependent on the cabin temperature within the predetermined range. The adjusted initial value for power may be based on operating voltage, duty cycle, or a percentage of the maximum operating voltage or duty cycle, as defined by the table stored in the processing module 120. The adjusted initial value is less than the predetermined value in order to provide acoustic comfort and NVH reduction when the vehicle cabin 105 is in a moderate condition.

FIG. 3 depicts a control strategy 300 for reducing NVH harshness by reducing blower speed when the interior cabin 105 is in a moderate condition. At block 310, the passenger manually inputs the user selected climate setting into the user input device 110 to be sent to processing module 120. At block 315, processing sensors 125 are feeding the cabin temperature (the initial cabin temperature 210), to processing module 120. The processing module 120 at block 320 determines whether the vehicle cabin 105 is in a moderate condition, or predetermined range, based on the data from the processing sensors 125. If the vehicle cabin 105 is not within the predetermined range, i.e., not in a moderate condition, at block 330 the processing module correlates via the table 200 an initial value for power corresponding to the maximum blower speed value based on the user input and temperature, and outputs the value to the controller. At block 335, the controller sets the blower to the maximum speed value.

If the vehicle cabin 105 is within the predetermined range, i.e., it is in the moderate condition, at block 340 the processing module 120 correlates the initial interior cabin temperature 210 with an adjusted initial value for power, which corresponds to a blower speed from table 200, and outputs the value to the controller. At block 345, the controller sets the blower to the adjusted initial value, which is less than the initial value.

By reducing the blower speed when the cabin is in moderate condition, the noise, vibration, and harshness (NVH) levels of the blower are reduced, and thus the acoustic comfort level of the passenger is improved. Benefits include but are not limited to reduced power consumption from the HVAC system in many climatic conditions, and no performance degradation in extreme climatic conditions where maximum performance is needed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle climate system comprising:
   sensors for monitoring cabin temperature;
   a blower; and
   a controller configured to, responsive to input of a particular user selected blower setting
      operate the blower with an initial power having a predetermined value being defined by a maximum blower speed for the particular blower setting and having a first noise level, provided that cabin temperature is outside a predetermined range corresponding to a moderate cabin condition as defined by a first threshold cabin temperature and a second threshold cabin temperature and detected by the sensors, the predetermined range being therebetween and independent of target temperature and the particular blower setting; and
      upon the cabin temperature being within the predetermined range, operate the blower with a reduced initial power having a value less than the predetermined value as defined by a percentage of the predetermined value, and the value less than the predetermined value corresponding to an adjusted blower speed having second noise level, less than the first noise level to reduce cabin noise.

2. The vehicle climate system of claim 1, wherein the percentage of the predetermined value is about 80% when the cabin temperature is within the predetermined range.

3. The vehicle climate system of claim 1, wherein the value less than the predetermined value is dependent on the cabin temperature.

4. The vehicle climate system of claim 1, wherein the predetermined value corresponds to a maximum speed of the blower.

5. The vehicle climate system of claim 1, wherein the value less than the predetermined value is defined as a percentage of the predetermined value.

6. The vehicle climate system of claim 1, wherein the first threshold cabin temperature is 5 degrees Celsius, and the second threshold cabin temperature is 33 degrees Celsius.

7. The vehicle climate system of claim 6, wherein the first threshold cabin temperature is 0 degrees Celsius, and the second threshold cabin temperature is 25 degrees Celsius.

* * * * *